Patented Feb. 26, 1929.

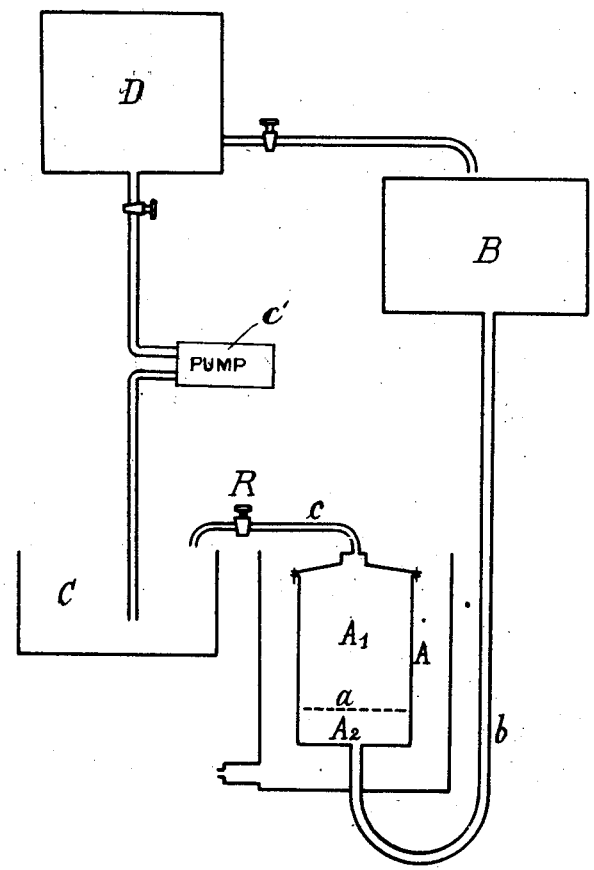

1,703,730

UNITED STATES PATENT OFFICE.

CHARLES FRAISSE, OF CAVAILLON, FRANCE.

PROCESS FOR THE MANUFACTURE OF PRESERVED FRUIT.

Application filed February 26, 1926, Serial No. 90,861, and in France April 8, 1925.

It is recognized in current practice that in the preserving of fruit products the natural water of the fruit is replaced by a syrup consisting of sugar or of sugar and glucose which is sufficiently dense to preserve the manufactured fruit product.

In the manufacture of preserved fruit, the process consists in obtaining this result with the minimum change in the appearance of the fruit.

The said manufacture is subject to certain conditions. For instance the vegetable cells consist of small sacs having a double membrane, containing the cell juice. Such membranes are more or less permeable, and they tend to act as osmotic membranes, so that when a fruit is immersed in a syrup whose density exceeds that of the juice in the cells of the fruit, an osmotic pressure will be produced between the two liquids which will tend to exhaust the fruit, and the latter may thus become wrinkled.

These considerations lead to two principles which are common to all of the known processes:

1. The fruit must first be subjected to a boiling in water for a greater or less time, and this operation serves to increase the permeability of the cell membranes whereby the absorption of the syrup will be facilitated and the osmotic effects will be reduced to the minimum.

2. When the fruit is placed in the syrup, it is necessary to obtain the minimum difference between the cell juice and the said syrup, so that the fruit after boiling as above stated must be placed in a syrup of a very low density, the density being then increased according as the density of the liquid in the cells increases by absorption.

To recapitulate, all the known processes comprise the following operations:

1. The fruit is preliminarily boiled in water.

2. The fruit remains for a certain time in a bath of syrup of very low density, and the density is gradually increased according as the fruit becomes acted upon, and is raised to the point necessary for the preservation of the manufactured product. According to the various methods in use, this concentration is continuous or intermittent, and the time required for the manufacture varies from 3 or 4 days to 5 weeks.

In all such processes, the density of the syrup for the fruit is increased as a rule in the following manner: firstly by successive heating operations by direct heat or by steam heat in suitable vessels; secondly by slow evaporation, the vessels in which the fruits and the liquid are contained being heated on the water bath; thirdly by means of tanks which have a large evaporating surface and are heated in any suitable manner; fourthly by evaporation in heating chambers supplied with a current of air; fifthly by successive concentrations in vacuo; sixthly by the use of apparatus consisting as a rule of a fruit vessel, a syrup tank and a concentrating apparatus of a known type operating by a vacuum or by evaporation from a large surface, the syrup being circulated in a closed circuit by a pump or like device, and being concentrated to a slight degree during each passage through the concentrating device.

All of the above mentioned processes require a considerable amount of labour and a very close surveillance, and they must be carried out by the use of complicated apparatus whereby a great expense for first cost and installation is necessitated.

In my improved processes and apparatus, all drawbacks inherent in the known methods are obviated. In the manufacture of preserved fruits I make use of the properties possessed by porous walls, which properties consist in the fact that such walls, when placed between solutions of different densities, will allow such solutions to diffuse through their substance only at a reduced rate.

In my said process, the following conditions prevail:

1. When two syrup solutions of different densities are separated by a porous wall, a diffusion will take place; the weaker solution will become stronger, while the stronger solution will become weaker, and this diffusion will continue until the densities will be equilibrated.

2. If the plant comprises an arrangement whereby the density of the stronger solution is constantly maintained, either by the proper renewal of the said solution or by circulating the said solution against the wall at a suitable pressure, or by like means, and if the plant further comprises means for the discharge of the weaker parts of the said bath, it is observed that after a certain time the solutions will have a like density on each side of the porous wall, but this density will be that of the stronger solution.

3. It is thus evident that if the stronger solution is maintained at all times at a strength corresponding to what is necessary to preserve the fruit, and if the raw fruit is placed in the weaker solution, whose density at the beginning of the operation corresponds to the fruit to be treated, the density of said solution will slowly increase until it attains the density of the stronger solution, i. e. the strength required to properly preserve the fruit.

By the above-mentioned treatment, the most favourable conditions for the manufacture are obtained.

The principal advantages of my said process over the known processes are as follows:

1. The density of the fruit bath is increased in the most progressive degree, and so to speak insensibly, whilst in the known methods the strength is increased by repeated operations each of which represents several degrees Baumé. My said process thus represents a considerable progress in the manufacture of preserved products.

2. In my said process I provide for the continuous manufacture, day and night, without requiring any special surveillance. I thus afford a great saving of time and labour, and eliminate all abrupt operations such as the resumption of work after each interruption. On the other hand, if a sufficient amount of syrup is employed at the start of the operation, for instance by the use of a large tank, the manufacture can be carried on without requiring any labour.

3. The porous wall acts at the same time as a filter for the syrup, and will prevent all impurities from proceeding into the fruit; the latter may be placed in a closed vessel and hence protected against all foreign matter. I thus afford an improvement in the quality of the manufactured products.

4. The process may be carried out at all suitable temperatures.

To obtain the proper temperature, the fruit vessel can be immersed in a water tank which is brought to the suitable temperature.

5. I afford a great economy in heat as compared with the known processes for concentrating the syrups. In fact, in all of the known processes it is required to evaporate the water which has been brought into the bath by the fruit or by the weak syrup employed in the process. But, in my improved method, the matter to be evaporated in order to bring the weak syrup to the density employed at the end of the process is represented solely by (a) the water contained in the fruit employed (b) the water contained in the weak syrup used at the beginning of the process. In all the current processes, a third source of water must be added to the two sources mentioned. To make up for the water evaporated during the manufacture and thus to maintain the proper quantity of liquid, it is necessary to add an equivalent amount of syrup at the same density as the general liquid in use. For this purpose, a weak syrup is used during the first period, and later on a stronger syrup, but in all cases this adds a considerable amount of water which must afterward be expelled in order to attain the final density.

In this manner I effect a marked saving in fuel, thus affording a corresponding saving of labour, and further, the syrup which is subjected to a concentration requiring less time, is protected against the chemical changes due to a prolonged heating.

6. For the practical execution of my said process, I require only apparatus of a simple kind and without complicated parts, so that the upkeep is easy and the cost is much less than that of the apparatus used in the known installations.

*Description of the apparatus.*—The plant shown by way of example in the appended drawings comprises a vessel A made of copper, aluminium, enamelled sheet metal, this being suitable for operations at relatively high temperatures, but the said vessel may be made of steel plate, cement or like material coated with paraffin or like facing, if the operating temperature is below 30 degrees C.

The said vessel is divided into two parts $A_1$ $A_2$ by a porous wall $a$ which consists of a suitable porous substance, such as filter paper, chamois skin, textile fabrics, unglazed porcelain or the like. In the part $A_1$ is placed the fruit and the weak syrup used at the start. This part is closed by a tight cover having at the top an overflow $c$ for the discharge of the excess of syrup according as the diffusion takes place through the porous wall; said overflow is provided with a cock R whereby the discharge can be reduced or stopped, and the speed of the operation can be thus regulated.

The part $A_2$ contains the strong syrup which is supplied by the pipe $b$ which makes connection with a tank B which is placed at a suitable height above the vessel A, and which is disposed at a suitable height whereby the desired pressure against the porous wall will be obtained.

In all cases, the tank B may be made of galvanized sheet metal or like material affording an inexpensive construction, and the said metal may be tinned or otherwise coated with a material which will not be acted upon by the syrup in the dense and cold state.

The plant comprises a tank C—which may be made of the same material as the tank A— which is adapted to receive the overflow of the element $c$. The syrup which is collected at C may be circulated by a pump C', or by like means, into a concentrating device D in which it is brought to the original strength, i. e. to the density corresponding to that of the syrup of the preserved fruit; the syrup is thence circulated into the tank B, or into a corresponding tank pertaining to another apparatus, or into a tank in which the material is collected for use in a subsequent process.

It should be observed that the said apparatus may have any other suitable construction, and the said porous wall may be otherwise disposed; for instance the apparatus may be given the form of a filter press, comprising various chambers separated by porous partitions, each chamber containing alternately the concentrated syrup, and the fruit placed in a weaker syrup or I may construct the apparatus by reversing the arrangement above described, and herein the dense syrup is brought above the porous wall, or like devices comprising porous walls may be utilized.

The expression "porous wall" employed in the description may be extended so as to include walls which although not strictly of a porous nature, will possess analogous properties when employed with syrup and will hence afford like results, assuring the separation of the denser from the weaker syrup, and enabling the slow diffusion of solutions of different densities.

In this manner I may employ walls with sufficiently fine perforations such as sifting cloth or the like, consisting of various materials for instance wire gauze, or fabrics of silk, horsehair, asbestos or the like.

What I claim is:

1. A process for the manufacture of preserved fruit and preserves, characterized in that the progressive increase in the density of the syrup in which the fruit is placed is obtained by means of the diffusion of the denser syrup placed under pressure towards a weaker bath, through a wall which is perforated with fine holes.

2. A process for the manufacture of preserved fruit, comprising placing the fruit in a dilute solution of syrup and increasing the density of the said syrup by diffusing therein a denser syrup under pressure through a wall pierced with fine apertures.

3. A process for the manufacture of preserved fruit, comprising placing the fruit in a dilute solution of syrup and gradually increasing the density of the said syrup by diffusing under pressure of a denser syrup therein through a wall pierced with fine apertures, the said denser syrup having a constant density corresponding to the maximum density which the syrup is to have.

In testimony that I claim the foregoing as my invention, I have signed my name hereto.

CHARLES FRAISSE.